April 18, 1944.  F. RADECK  2,346,786
TYING MACHINE
Filed Sept. 5, 1941  7 Sheets-Sheet 1

Inventor
Frank Radeck
By
Attorneys

Inventor
Frank Radeck

April 18, 1944.  F. RADECK  2,346,786
TYING MACHINE
Filed Sept. 5, 1941  7 Sheets-Sheet 6

INVENTOR
FRANK RADECK
BY
ATTORNEYS

INVENTOR
FRANK RADECK
BY

ATTORNEYS

Patented Apr. 18, 1944

2,346,786

UNITED STATES PATENT OFFICE 2,346,786

TYING MACHINE

Frank Radeck, Milwaukee, Wis., assignor to Felins Tying Machine Company, Milwaukee, Wis.

Application September 5, 1941, Serial No. 409,676

6 Claims. (Cl. 100—31)

This invention appertains to tying machines, and more particularly to machines especially useful for tying bundles, packages, etc., but which can be used for any purpose, such as tying bunches of vegetables and the like, the machine being of the general type shown in the prior Patent No. 1,407,481, issued February 21, 1922.

One of the primary objects of my present invention is to provide novel means for power-driving the machine in connection with automatic means for setting the operating parts of the machine in motion from an electric motor after the package or bundle has been placed in correct tying position on the machine, whereby packages of various sizes and shapes can be easily and correctly tied without error.

Another salient object of my invention is to provide a power-driven tying machine embodying a tucker mechanism for holding the string tight against the bundle or package, after the needle has brought the cord under the package, whereby the cord will be effectively held in the desired position on the package during the forming of the knot, the tucker being operated in a novel manner from the main driving mechanism.

A further object of my invention is to provide a novel string-holder and operating means therefor, with novel means for receiving the cut string ends from said holder, and for guiding the waste cut string ends out of the machine and away from the operating parts of the machine.

A further important object of my invention is the provision of means for permitting the free movement of the string through the needle during the initial placing of the package or bundle in the machine, whereby the cord will be partially carried around the bundle without effort, means being provided for placing the string under tight tension on the needle when the needle carries the string under the package for completely encircling the package with the string.

A further object of my invention is the provision of a slip clutch arranged in the machine between the electric drive motor and the main drive shaft, so that the operating parts of the machine can be brought to an instant and abrupt stop when an obstruction is met, so that injury to the operator of the machine will be eliminated, and so that injury to the operating mechanism will also be prevented in case a solid object should become entangled in the operating parts.

A still further object of my invention is the provision of novel means for mounting the motor on the machine and for operating all of the parts in proper timed relation from the motor in a simple and efficient manner.

With these and other objects in view, the invention consists in the novel construction, arrangement, and formation of parts, as will hereinafter more specifically be described, claimed, and illustrated in the accompanying drawings, in which drawings:

Referring to the drawings in detail, wherein similar reference characters designate corresponding parts throughout the several views, the letter M generally indicates my novel tying machine, which includes a frame 15 on which the various operating parts of the machine are mounted.

The frame 15 includes a base plate 16 to which is firmly bolted or otherwise secured a main frame bracket 17. This frame bracket 17, in turn, supports a table top 18 on which the packages and bundles to be tied are placed. This table 18 can be formed from sheet metal, but is preferably constructed from polished steel. Suitable brace arms 19 can also be employed for connecting the table 18 with the base plate 16. The base plate 16, in turn, can be mounted upon any desired type of support (not shown), such as a table or desk top, or a wheeled supporting carriage. Obviously, where the device is mounted upon a wheeled carriage, the same can be easily moved from one point to another.

Firmly mounted upon the base plate 16 is an electric drive motor 20 of the desired rating, and the armature shaft 21 of the motor is connected, through the medium of a novel slip clutch 22, with a drive worm shaft 23. This drive worm shaft 23 is rotatably mounted in suitable bearings 24 mounted upon the base plate 16. The slip clutch 22 is illustrated in detail in Figure 7 and will be later described in detail.

Arranged below the worm shaft 23 is the main operating shaft 25, and this shaft has freely rotatably mounted thereon a worm wheel 26, which is in constant mesh with the worm shaft 23. The hub of the worm wheel 26 has formed thereon or secured thereto a clutch section 27, and feathered upon the shaft for rotation therewith and movement longitudinally thereof is the companion clutch section 28. Obviously, when the clutch section 28 is in operative engagement with the clutch section 27, the shaft 25 will be operated from the motor 20. A light expansion spring 29 is coiled about the shaft 25 and normally urges the clutch section 28 into operative engagement with the clutch section 27.

In order to normally hold the clutch section 28 away from the clutch section 27, a radially extending pin 30 is carried by the clutch section 28, and this pin is normally engaged by the inclined cam track 31 of the pivoted trip lever 32. The trip lever 32 is rockably mounted intermediate its ends upon a stub shaft 33 carried by one of the bearing brackets 24 for the worm shaft 23.

The trip arm 32 is normally held in a lowered position, with the cam track 31 in the path of the pin 30, by a leaf spring 34. This leaf spring is fastened to said trip lever and normally prevents movement of the lever.

When the trip lever is momentarily raised above the pin 30, the spring 29 moves the clutch section 28 into engagement with the clutch section 27, and the operating shaft 25 starts to rotate. Upon the lowering of the trip arm 32, the cam end thereof will again rest upon the hub of the clutch section 28, and the pin 30 will again ride into engagement with said cam end, as the shaft completes one revolution, and as the shaft reaches the end of one complete revolution, the pin 30 riding on the cam end 31 of the trip lever will draw the clutch section 28 out of engagement with the clutch section 27, and the shaft 25 will be brought to a standstill.

The shaft 25 operates the needle mechanism 35, the knotter mechanism 60, the string-holder mechanism 65, the cord tucker mechanism 85, and the string-severing and bundle-kicking mechanism 95.

Briefly, the needle mechanism 35, the knotting mechanism 60, and the string-holding mechanism 65 operate similarly to the mechanism shown in said prior patent, with the exception that the needle mechanism and the other parts are reversed relative to one another. In the present case the knotting mechanism 60 also operates along the same general principle as in my previous patent, but the position thereof is also reversed from that shown in my patent.

Figure 1:
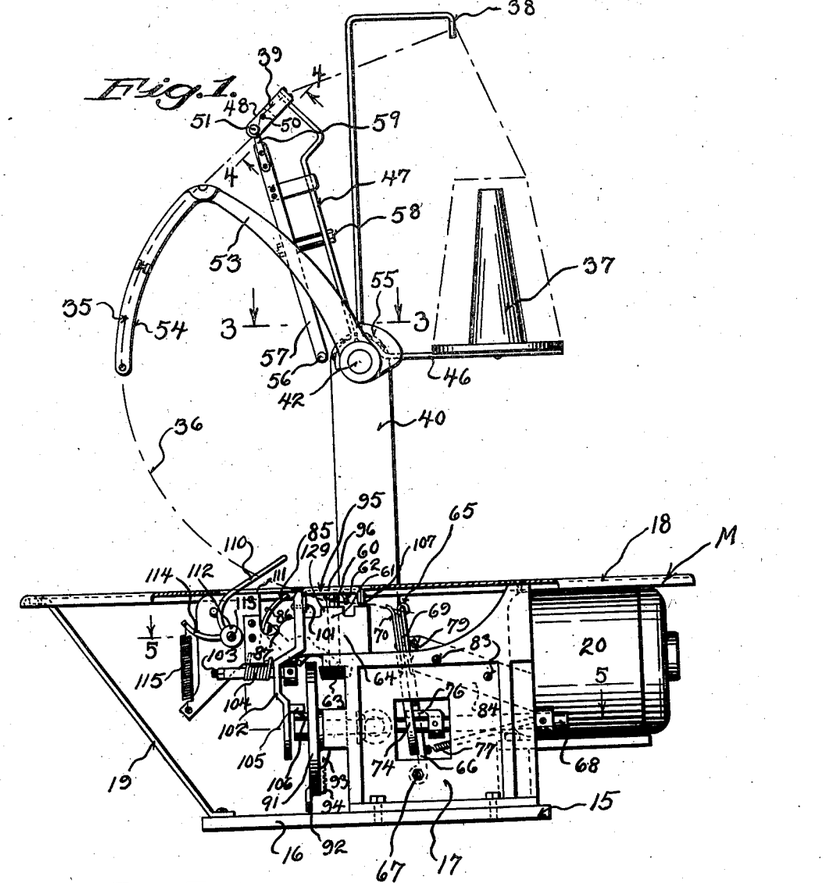
Figure 1 is a fragmentary side elevational view of my improved machine, showing parts thereof broken away and in section, the machine being set for receiving a package or bundle.

It is to be noted, for the present, that the string or cord, shown in dotted lines in Fig. 1 and indicated by the reference character 36, is paid off a cone or ball of twine 37 through an elevated string-holder 38, past my novel string tension device 39, to the needle mechanism 35. From the needle mechanism 35, the cord 36 extends through the table 18, under the string-cutter and package-kicking machine, past the knotting mechanism 60, to the string-holder mechanism 65, where the same is firmly held. Thus, when a bundle or package is placed on the table 18 and is slid rearwardly, the same will carry the string 36 therewith and around the rear thereof, and partially under the bottom thereof.

Referring back to the string or cord supporting mechanism, it will be seen that the base plate 15 carries an upstanding standard 40, the upper end of which rigidly supports a stationary hollow shaft 41, which extends over the table 18. The hollow shaft 41 rotatably supports a rotatable shaft 42. The inner end of the shaft has keyed or otherwise secured thereto the needle member 35, and the outer end of the shaft 42 has keyed or otherwise secured thereto a crank 43, and this crank 43 is operatively connected to a crank 44, through the medium of a connecting rod 45. The crank 44 is keyed or otherwise secured to the shaft 25, and, thus, when the shaft 25 is turned, the shaft 42 and the needle mehcanism will be oscillated.

The support 37 for the cone or ball of twine is fastened to a bracket 46, which is rigidly bolted to the stationary hollow shaft 41, and this shaft also has securely fastened thereto the cord guide 38, which is disposed between the cone of twine and the tension device 39. The tension device 39 is, in turn, arranged between the needle member 35 and the elevated cord guide 38, and this tension device includes a rigid guide arm 47 bolted to the hollow shaft 41. The upper end of the arm 47 carries (see Figure 4) an L-shaped foot 48, having an eye through which the cord is threaded. A tension plate 49 is disposed in parallel relation to the foot 48, and the cord is threaded between the L-shaped foot 48 and the tension plate 49. The tension plate 49 is slidably mounted upon a guide bolt 50 and a tension bolt 51. The tension bolt 51 is slidably carried both by the tension plate 49 and the foot 48, and the bolt normally draws the tension plate 49 toward the foot 48 and into engagement with the cord by means of a light expansion spring 52, which is coiled about the tension bolt 51. This expansion spring 52 is confined between a nut threaded on said tension bolt and the foot 48. Obviously, by rotating the nut, the force of the spring can be adjusted.

The tension is such that under normal conditions the cord or twine 36 can be readily pulled off the cone 37 between the foot and the tension plate, so that when a package is placed on the front of the table and slid rearwardly, the cord will easily follow the package. However, when the needle mechanism 35 is brought into play, the tension on the cord is increased by the plate 49, so that the cord will not be too quickly drawn off the cone, and so that the cord will be brought tight around the package or bundle being tied. The means for increasing the tension will be described with the needle mechanism 35.

The needle mechanism 35 includes an oscillating arm 53, which is securely fastened to the shaft 42 and an arcuate needle arm 54. This needle arm 54 is provided at spaced points with cord guides (namely, at the opposite ends of the arcuate needle and an intermediate portion of the needle). This guide means forms sufficient friction with the cord so that the cord will be carried with the needle during its oscillation. The hub of the arm 53 of the needle has formed thereon a cam trip 55, which is adapted to move into engagement with a button 56 carried by the lower end of the rock arm 57 during the lowering movement of the needle. The rock arm 57 is mounted for swinging movement intermediate its ends on a bolt 58 carried by the rigid arm 47.

Figures 2, 4:
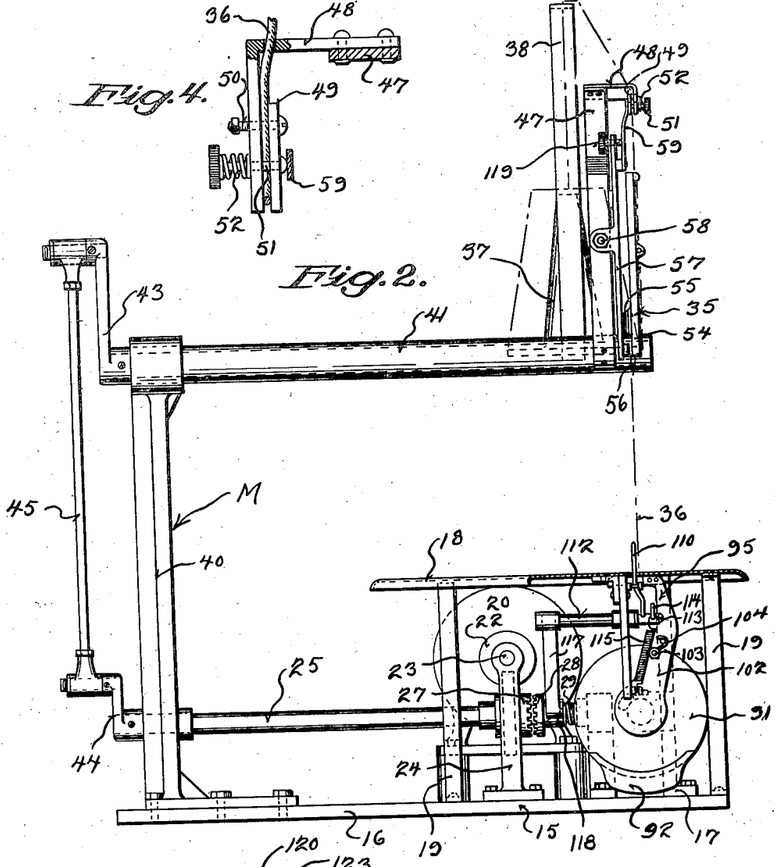
Figure 2 is a front elevational view of my machine, showing parts thereof broken away and in section.
Figure 4 is an enlarged, fragmentary, detail, sectional view taken on the line 4—4 of Figure 1, looking in the direction of the arrows, illustrating the tensioning means for the cord or twine.
Figure 3:
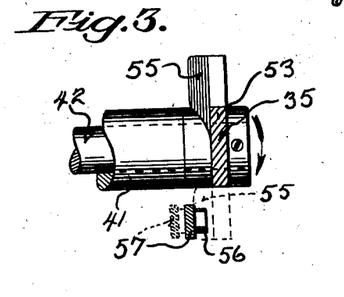
Figure 3 is an enlarged, detail, sectional view taken on the line 3—3 of Figure 1, looking in the direction of the arrows, illustrating the cam mechanism provided for increasing the tension on the cord after the bundle has been placed in operative position on the machine and the needle starts down for carrying the cord completely around the package or bundle.
Figure 5:
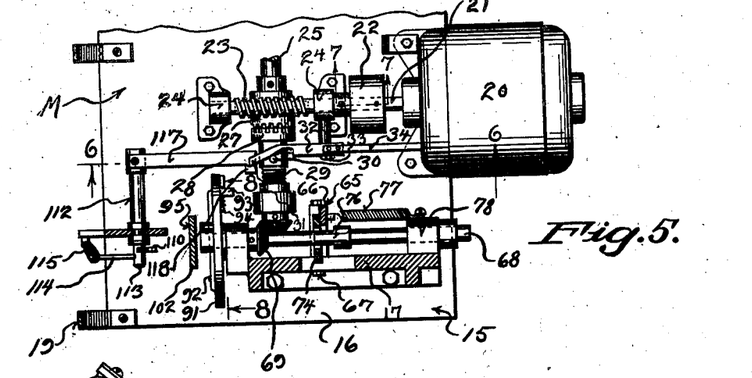
Figure 5 is a horizontal sectional view through the machine taken on the line 5—5 of Figure 1, illustrating the novel drive mechanism for the various parts.
Figure 6:
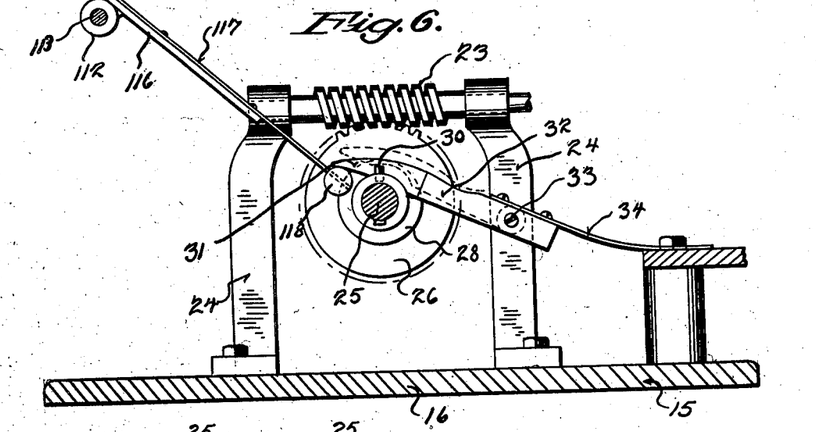
Figure 6 is an enlarged, fragmentary, detail, vertical, sectional view taken on the line 6—6 of Figure 5, looking in the direction of the arrows, illustrating the novel clutch control mechanism for automatically connecting and disconnecting the motor to the operating drive mechanism.

The upper end of the rock arm 57 has secured thereto a leaf spring 59, which is adapted to engage the tension bolt 51, as is clearly shown in Figure 4. It can be seen that as the needle swings down, the cam 55 will rock the arm 57, and the leaf spring 59 will be moved into tight contact with the tension bolt 52, and the tension plate 49 will be carried into comparatively tight gripping engagement with the cord.

The knotting mechanism 60 includes an upright rotatable shaft 61 carrying on its upper end the rigid cord-gripping finger or jaw 127 and the movable cord-gripping finger or jaw 128. The rotatable shaft 61 of the knotting mechanism also carries the cord guide ear 62, which can be formed on the rigid cord gripping finger or jaw 127. The lower end of the knotter shaft 61 has keyed or otherwise secured thereto a pinion 63, whereby the knotter mechanism will be rotated and the movable gripping finger actuated at the appropriate time. The knotter shaft is rotatably mounted in a suitable bearing 64 carried by the main bracket 17 and the upper end of the bearing has formed thereon a cam track 129. It is to be noted that the upper end of the knotter shaft terminates slightly below the table 18.

Figure 16:
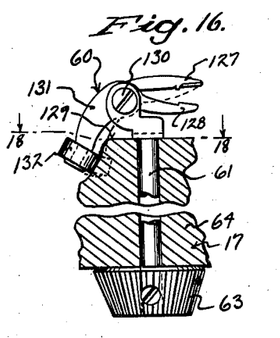
Figure 16 is an enlarged detail fragmentary sectional view taken on the line 16—16 of Figure 18 illustrating the knotting mechanism and showing the movable jaws in their open cord receiving position.
Figures 17, 26:
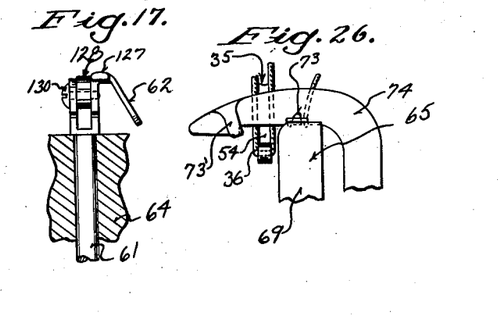
Figure 17 is an enlarged fragmentary detail vertical sectional view showing the knotter jaws from the front.
Figure 26 is a side elevational view of the string holding mechanism and the needle end, the parts being shown in the position illustrated in Figure 15.
Figure 18:
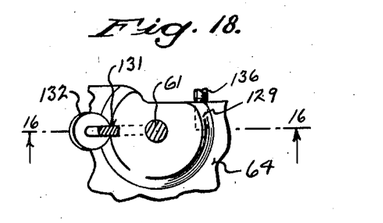
Figure 18 is a detail horizontal sectional view taken on the line 18—18 of Figure 16 looking in the direction of the arrows.
Figure 19:
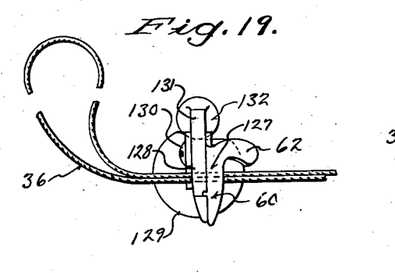
Figures 19 to 23 are detail diagrammatic views showing the several positions and actions of the knotter in tying the cord.
Figure 21:
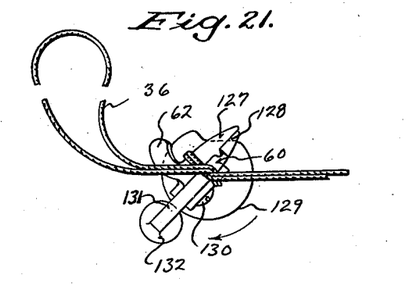
Figure 22:
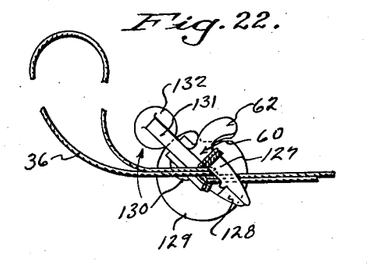
Figure 23:
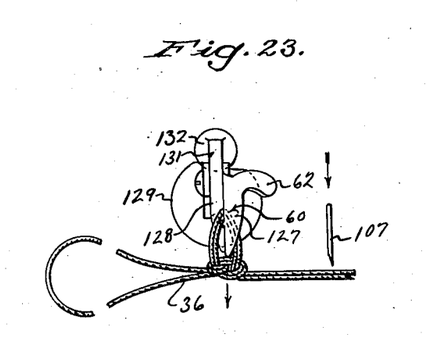

The movable gripping jaw or finger 128 is rockably mounted at its inner end on a pivot 130 carried by the inner end of the jaw or finger 127 and the movable jaw 128 has formed thereon the depending arm 131, which in turn carries the anti-friction roller 132. This roller engages the cam track 129. Initially the anti-friction roller 132 rests against the lower point of the cam track and hence the arm 131 is comparatively near the shaft 61 and the jaws 127 and 128 will be in their cord-gripping position (see Figure 23). In Figure 19 the jaws are also in their closed position but the cord has not as yet been gripped by said jaws. Upon rotation of the shaft 61 the anti-friction roller will ride on the high point of the cam track which will rock the arm 131 outwardly and the jaw 128 will be carried away from the stationary or rigid jaw 127 (see Figures 16, 21 and 22).

Figure 9:
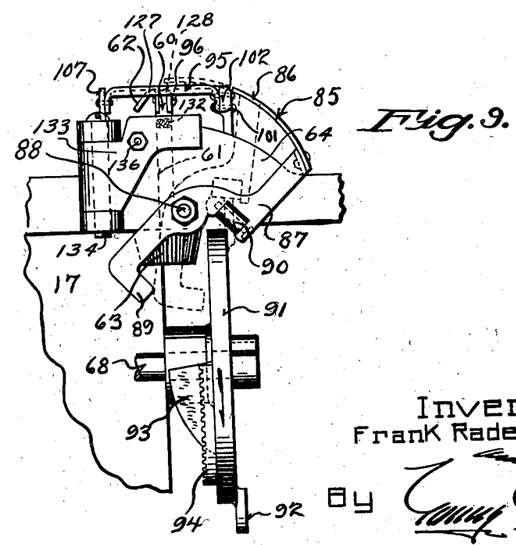
Figure 9 is an enlarged, detail, fragmentary view illustrating the control mechanism for the tucker and the knotting mechanism.
Figure 15:
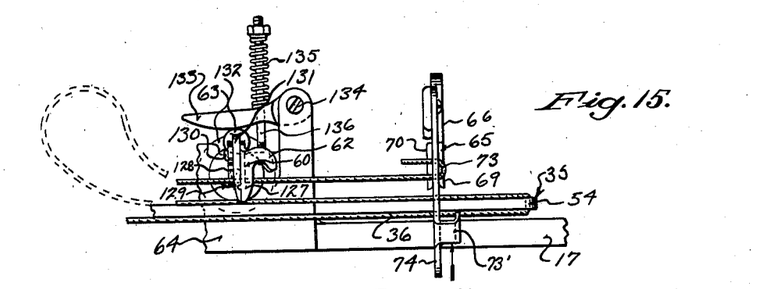
Figure 15 is an enlarged fragmentary top plan view illustrating the knotter mechanism, and the string holding mechanism, the table and the bundle kicking mechanism being eliminated, the parts being shown with the needle under the table and the cord around the package.

In order to insure the moving of the arm 131 inwardly as the roller 132 rides off the high point of the cam track, so that the jaw 128 will be moved toward the jaw 127, a swinging presser lever 133 is provided. This lever 133 is rotatably mounted on a pivot 134 carried by the bracket 64 at one side of the shaft 61 (see Figures 9 and 15). An expansion coil spring 135 normally urges the presser lever 133 toward the roller 132 and this spring can be carried by a bolt 136 anchored in said bracket 64. The presser lever 133 is provided with an enlarged opening through which the bolt 136 extends. Hence the roller 132 is normally urged into firm contact with the cam track 129.

The string-holding mechanism 65 is arranged in rear of the knotter 60 and is mounted for swinging movement toward and away from said knotter. This string-holder includes a rock arm 66, the lower end of which is mounted upon a stub shaft 67 carried by the main bracket. The arm 66 partially surrounds the driven shaft 68, and this shaft is operatively connected to the main operating shaft 25 through the use of intermeshing beveled gears 69. This shaft 68 is also employed for actuating the knotter mechanism 60 and the tucker mechanism 85, as will be later set forth.

Figure 10:
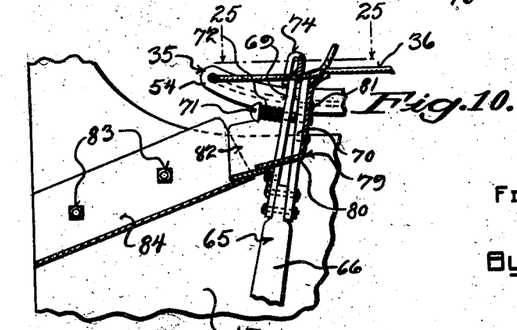
Figure 10 is an enlarged, detail, vertical, sectional view taken on the line 10—10 of Figure 12, looking in the direction of the arrows, illustrating the string-holder and the guiding means for receiving the cut string ends from the holder.

The upper end of the rock arm 66 has secured thereto a pair of spaced fingers 69 and 70, which are normally drawn toward one another by the use of a tension bolt 71. As is clearly shown in Figure 10, the tension bolt is carried by the finger 70 and extends through the finger 69, and this bolt has coiled thereabout a tension spring 72. The tension spring is confined between the head of the bolt and the finger 69. The finger 69 has formed on its upper end a pointed prong 73, around which the cord is adapted to catch during the movement of the needle 35.

Pivotally mounted upon the rock arm 66 is the shuttle arm 74, which operates in conjunction with the fingers 69 and 70 for firmly gripping the cord. The movement of the shuttle arm functions to draw the cord into clamped position and to gradually work the cut waste ends of the cord from between the clamping fingers. The prong 73 prevents the cord from being pulled off the gripping fingers in one direction by the shuttle arm during the forming of the knot. The shuttle arm 74 is rockably mounted intermediate its ends upon a stud bolt 75 carried by the rock arm 66, and the lower end of the shuttle arm is bifurcated so as to straddle the shaft 68, and the shaft 68 at this point has formed thereon or secured thereto a trip cam 76. The trip cam 76 functions to wipe against the inner surface of the forked lower end of the shuttle arm, and, thus, swing the shuttle arm back and forth over the fingers 69 and 70 during the rotation of the shaft 68.

The complete string-holder is normally held away from the knotting mechanism 60 by a spring 77, and this spring has one end anchored to one of the bearings 78 for the shaft 68, and its other end anchored to the rock arm.

Carried directly by the rock arm and positioned below the spring gripping fingers 69 and 70 is a waste cord-receiving cup and guide shield 79. One section 80 of the cup and guide shield is securely fastened by means of screws 81 to the finger 70, and this section extends into the U-shaped portion 82 of the cup and guide shield, and this section 82 is firmly secured to the finger 69. Rigidly fastened by means of screws 83 to the main bracket 17 is a downwardly inclined trough 84, and the cup and guide shield 79 moves into and out of the upper end of the trough, so that the waste cut ends of the cord will be delivered into the trough. The vibration and movement of the rock arm functions to allow the string ends to work into the trough.

The tucker mechanism 85 operates in conjunction with the knotting mechanism 60 and the string holder 65, and the tucker 85 includes an arcuate tucker arm 86 carried by the upper end of the tucker rock arm 87. This tucker rock arm 87 is rockably mounted intermediate its ends upon a stud bolt 88 carried by the bearing for the knotter shaft. This pivot is directly above the knotter pinion 63. The lower end of the tucker rock arm 87 terminates in an inwardly directed operating finger 89.

Directly above the pivot 88, the tucker rock arm 87 carries an anti-friction roller 90, which is disposed directly above the actuating wheel 91, which is keyed or otherwise secured to the driven shaft 68. This driven shaft carries on one part of its periphery a cam lug 92 for engaging the roller 90, so as to cause the rocking of the tucker arm 87 at the desired time, and, thus, cause the movement of the arcuate tucker arm 86 over the table and toward the knotter shaft. The inner face of the wheel 91 has also formed thereon a cam lug 93, which is adapted to engage the inner end of the finger 89 to cause the positive return of the tucker rock arm 87 to its normal position, as shown in full lines in Figure 9.

Figure 8:
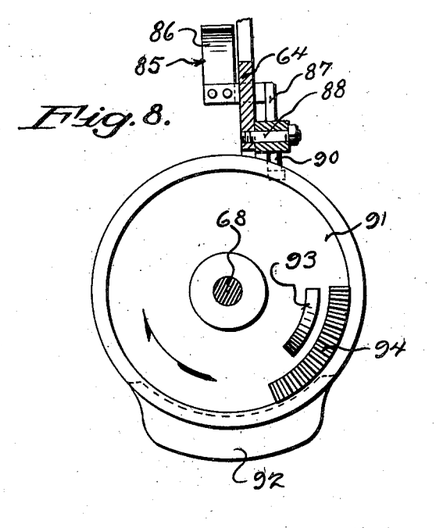
Figure 8 is an enlarged, detail, vertical, sectional view taken on the line 8—8 of Figure 5, looking in the direction of the arrows, illustrating the control means for the tucker and the knotting mechanism.

An arcuate sector gear 94 is also formed on the wheel 91, and this sector gear is adapted to mesh with the knotter pinion 63 at the desired time to cause the knotter shaft to make one complete revolution. By referring to Figures 8 and 9, it will be noted that the cam track 92 is arranged in advance of the sector gear 94 and the cam track 93. Hence, the cam track 92 serves as means for moving the tucker arm into a string-engaging position prior to the rotation of the knotter shaft, and the string is held firmly by the tucker arm until the knotter makes substantially one-third of a revolution, at which time the tucker arm is returned to its normal position by the cam track 93.

Referring specifically to the string-cutting mechanism and the package or bundle-kicking mechanism 95, it will be noted that the same includes a flat kick plate 96 normally positioned in an opening 97 formed in the table top 18. This kick plate 96 has formed therein an offset cord guide slot 98, which terminates directly above the knotter mechanism 60. When the kick plate 96 is in its raised normal position, the slot 98 has its outer end in communication with the inclined end 99 of an enlarged slot 100, through which the needle mechanism swings during the lowering thereof. The slot 99 communicates with the opening 97 in the table top, and, hence, during the downward swinging movement of the needle, the cord will be carried from the slot 99 into the slot 98 of the kick plate.

This kick plate is firmly bolted, as at 101, to the kick plate rocker arm 102. The kick plate rocker arm is mounted for swinging movement intermediate its ends on a stub shaft 103 carried by a part 64 of the supporting frame. The kick plate rocker arm is normally held in its raised position by a torsion spring 104, and this spring is coiled about the shaft 103, and has one end connected to said frame part 64, and its other end on a lug on the kick plate arm 102. The lower end of the arm 102 below its pivot has formed thereon or secured thereto a trip pin 105, and this trip pin is arranged in the path of a trip lug 106 formed on or secured to the shaft 68. The trip lug 106 is so positioned relative to the cam tracks 92 and 93 and the sector gear 94 as to operate the kick plate after the knotter shaft has made one complete revolution, so that the kick plate will then function to move laterally of the table top and give the package a push. Simultaneous with this movement, the kick plate operates as cord-stripping mechanism and the cord-cutting mechanism.

Figures 12, 13, 14:
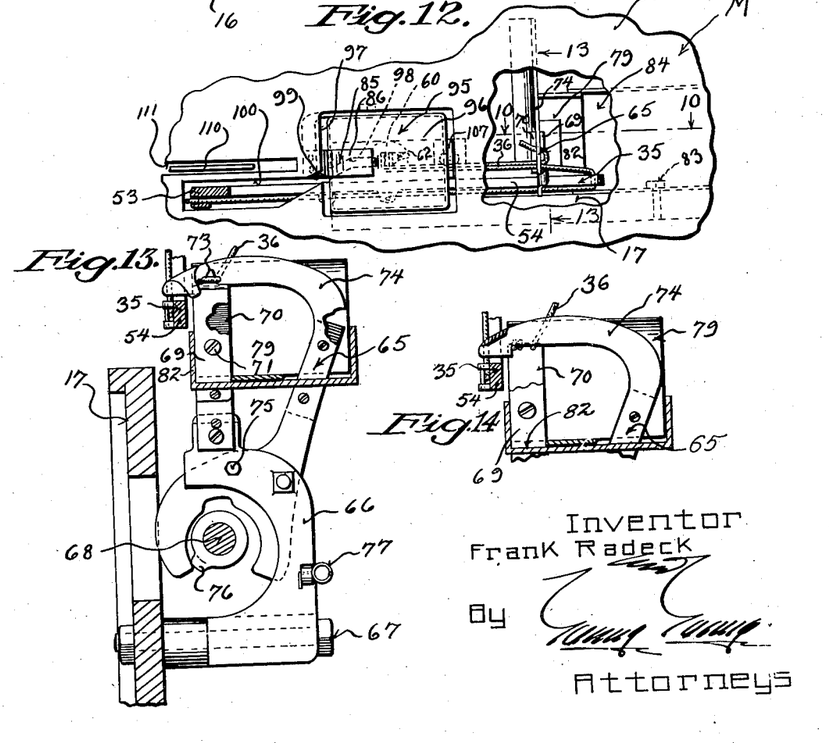
Figure 12 is a fragmentary, top, plan view of the improved machine, with parts thereof broken away and in section, the parts in section being taken on the line 12—12 of Figure 11, looking in the direction of the arrows.
Figure 13 is a detail, sectional view taken on the line 13—13 of Figure 12, illustrating the novel string-holder, with the needle carrying the string to said holder.
Figure 14 is a view similar to Figure 13, with additional parts of the figure broken away and in section to illustrate the position of the string or cord on said holder.

The cord-cutting mechanism includes a sharp knife 107 secured to the inner end of the kick plate, and the knife is so arranged as to wipe across the taut string between the string-holder 65 and the knotting mechanism 60, so as to cut the cord, leaving a free cut end in the cord-holding mechanism 65. The kick plate 96 moves laterally (referring to Figure 12) when the knotter shaft has made its complete revolution, as stated before, and when the plate moves laterally, the same will carry the string therewith, due to the position of the string or cord in the slot 98, and, thus, the string or cord will be stripped off the knotter, and the knotter will then have completed the knot by pulling the string in through the loop or bow.

Figure 11:
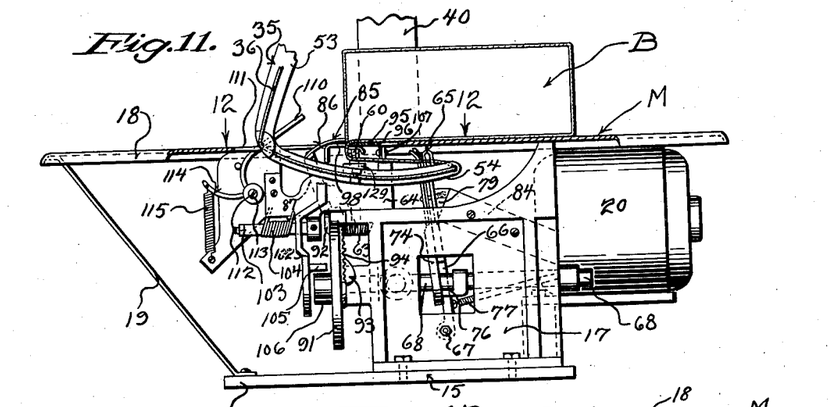
Figure 11 is a fragmentary, side, elevational view of the machine, with parts thereof broken away and in section, the view corresponding to Figure 1, but showing a package on the machine, and the needle in its lowered position for carrying the cord completely around the package over the knotter and to the cord-holding mechanism.

Obviously, one of the important features is the means for setting the mechanism in operation after the package or bundle, indicated by the reference character B in Figure 11, is in its proper position for tying. This means includes the trip arm 110, which normally extends in a raised position above the table top 18 through a slot 111 formed in the table top. The lower end of the trip arm 110 is secured to a hub sleeve 112, which is rotatably mounted upon a stub shaft 113 carried by one of the frame pieces of the machine. This hub sleeve has secured thereto an outwardly extending crank 114, having connected therewith a tension coil spring 115. This spring has its inner end connected to one of the frame pieces and normally pulls down on the crank 114 to hold the trip arm 110 raised. The hub sleeve 112, in turn, has fixed thereto an inwardly extending leg 116, to which is secured a leaf spring 117 carrying a hammer knob 118, which is normally positioned under the cam end 31 of the clutch trip arm 32.

In operation of this part of my device, it will be seen that when the package or bundle B is slid on the table top into engagement with the cord 36, the package will depress the trip arm 110 and move the hammer 118 below the clutch trip lever 32, and, hence, the trip lever will be disposed in such a position as to insure the holding of the movable clutch section 28 out of engagement with its companion clutch section 27. As the package or bundle B is pushed rearwardly, the string or cord 36 is carried therewith, and, obviously, the trip lever is held depressed until the entire package is in correct position under the needle mechanism 35. At this time, the package will ride off the trip arm 110, and the spring 115 will forcibly swing the trip arm to a raised position, carrying the hammer 118 therewith, which will deliver a sharp quick blow to the cam end 31 of the clutch trip lever 32. This sharp blow will knock up the trip lever above the pin 30, and the clutch section 28 will be moved quickly into engagement with its clutch section 27 by the light coil spring 29.

The shaft 25 will now start to rotate, and all of the various parts will be automatically operated. The trip lever 32 will immediately return to its normal position, with its cam end 31 on the hub of the section 28, and, consequently, when the shaft makes one revolution, the pin 30 will again be brought into engagement with said cam end 31 for drawing said clutch section 28 out of engagement with the clutch section 27. Thus, the shaft 25 will automatically make one complete revolution and be brought to a definite stop. One revolution of the shaft 25 is sufficient to bring about the wrapping of cord or twine about a bundle or package in one direction and for tying a knot in said cord or twine.

Figure 25:
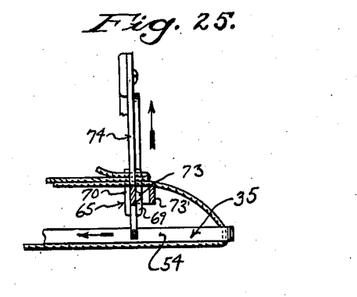
Figure 25 is a detail fragmentary horizontal sectional view taken on the line 25—25 of Figure 10 looking in the direction of the arrows showing the cord holding mechanism.
Figure 27:
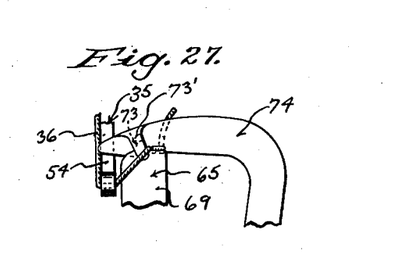
Figure 27 is a view similar to Figure 26 with the parts in the position shown in Figure 25.

After the package has been placed on the table and the cord has been partially carried about the same by the placement of the package on the table, the tying of the package is effected in the following manner: When the clutch 27, 28 is actuated, the operating shaft 68 will be turned, and synchronous with the rotation of the shaft 68, the actuation of the needle mechanism will take place. As the desired amount of cord or twine has been taken off the cone 37, the needle will lower and the bar 54 thereof will swing through the slot 100 under the kick plate 96, past the cord or twine-holder 65. This movement will bring the cord over and under the package, through the slot 98 of the kick plate, under the jaws of the knotter, and under the hooked end of the shuttle arm 74 of the cord-holder 65. The shuttle arm is moved over by the cam 76 to engage the cord and is then pulled back by the cam over the resilient fingers (see Figures 25 and 27) so as to bring the cord from the needle over the top of the resilient fingers 69 and 70, where this cord length and the cord free end is firmly held by the upper ends of the said fingers and the shuttle arm.

Figure 20:
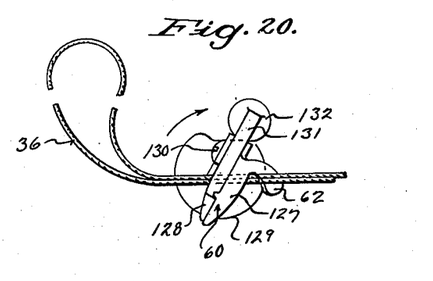
Figure 24:
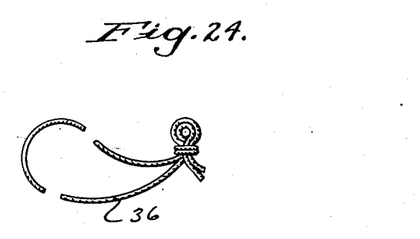
Figure 24 is a detail view showing the knot after tying thereof and the severing of the cord ends.

The tucker 85 is now brought into operation, and the tucker arm swings over the kick plate and tightly engages and holds the cord, as is clearly shown in Figure 11. At this time, the knotter 60 starts to rotate, (see Figure 20) and the two strands of cord are engaged by the ear 62. The cord is held taut by the tucker 85 and the string holder 65 on opposite sides of the knotter 60. The cord is pulled around with the knotter by the ear 62. The tucker holds the cord above the knotter and as the knotter continues to rotate the cord is brought over the two knotter jaws and twisted (see Figure 21) and the cord loop or bow is thus formed. During this rotation of the knotter, the jaws of the knotter are held open by the cam track 129 and as the knotter nears the end of its cycle of rotation, the jaws receive that portion of the cord disposed between the knotter and the string holding mechanism 65 (see Figure 22). When the knotter completes its cycle of rotation the roller 132 will ride off of the high point of the cam track 129 and will be forced inwardly by the presser lever 133 and the jaws will close and grip the cord. During the rotation of the knotter and the forming of the loop or bow tension is exerted on the cord and the cord holder 65 will be slightly pulled toward the knotter against the tension of its coil spring 77. After the completion of the knotter revolution, the tucker is swung back to its normal position and the kick plate 96 is moved to the right (see Figure 12), initially stripping the loop or bow off of the knotter, and the jaws of the knotter will hold the cord, so that the same will be drawn through the loop or bow, and after the cord is drawn through the loop or bow, and pulled tight (see Figure 23), the continued movement of the kick plate will then pull the cord from between the jaws and the knot will be formed (see Figure 24). Just prior to this time the knife 107 will engage the taut cord between the knotter and the cord-holder and sever the cord, allowing the cord-holder 65 to swing back under the influence of its spring to its normal position, with the cord guide and cup 79 in engagement with the trough 84. By this time, the needle 35 has returned to its normal position, and the machine is ready to tie another package or bundle.

During the movement back and forth of the shuttle arm 74 over and between the resilient fingers 69 and 70, the cut ends of the strings will be gradually worked off of the resilient fingers 69 and 70, and such cut ends will fall into the guide and receiving cup 79, where the same will eventually find their way into the trough 84 and out of the machine.

As heretofore stated, during the downward swinging movement of the needle mechanism 35, the tension on the cord is increased adjacent the cord guide 38 by the spring 59. If preferred, the tension of the spring can be initially set by the use of an adjusting screw 119. This screw 119 is carried by the tension rock arm 57 and bears against the spring 59.

Figure 7:
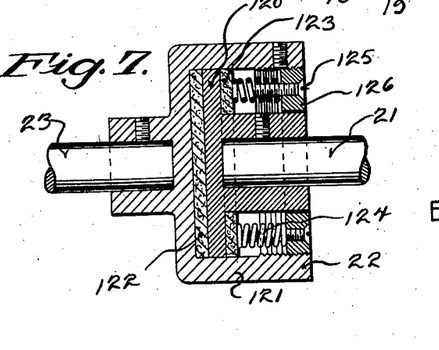
Figure 7 is an enlarged, detail, sectional view taken on the line 7—7 of Figure 5, looking in the direction of the arrows, illustrating my novel slip clutch.

One of the important features of the invention is the slip clutch 22, heretofore mentioned, and this slip clutch is shown in detail in Figure 7 of the drawings.

As illustrated, a friction disc 120 is secured to the armature shaft 21, and this disc is received within a cup 121 keyed or otherwise secured to the worm shaft 23. The cup 121 has fixed therein a felt or similar friction plate 122, against which the friction disc 120 is adapted to bear. A friction ring 123 is urged against the outer face of the disc 120 by a plurality of coil springs 124, and these springs also urge the disc 120 toward the plate 122. The springs 124 are carried by screws 125, which are threaded in a supporting ring 126. The ring is, in turn, threaded into the cup, whereby all of the springs can have the tension thereof regulated simultaneously.

By this arrangement of slip clutch, should any part of the operating mechanism encounter a solid object, the armature shaft 21 is free to rotate within the cup, and the parts of the operating mechanism of the machine will be held against movement until the obstruction is removed. As the slip clutch is arranged directly between the electric motor 20 and the worm shaft, the stopping of the machine at any point will not hinder the timing of the parts of the device, as said slip clutch is arranged in advance of the timed parts of the tying mechanism.

From the foregoing description, it can be seen that I have provided an improved tying machine, embodying novel cord tensioning devices, novel control operating mechanisms, together with an improved tying structure.

Changes in details may be made without departing from the spirit or the scope of this invention, but what I claim as new is:

1. In a package and bundle tying machine, a frame, a table for supporting the bundles or packages to be tied mounted upon said frame, a constantly operating motor carried by said frame and mounted below the table, a main operating shaft rotatably carried by the frame and disposed below the table, a clutch including a movable clutch section for operatively connecting the motor to the shaft, spring means normally urging the movable clutch section into driving engagement with the other clutch section, said movable clutch section being feathered on the shaft, a radially extending pin carried by the movable clutch section, a cam normally disposed in the path of the pin for causing the pin to draw the movable clutch section away from the other clutch section during the rotation of the shaft, and means for momentarily moving the cam out of the path of said pin including a spring-pressed hammer, a trip normally projecting above the table and in the path of the packages or bundles, for placing the hammer under tension when depressed by the packages or bundles, whereby upon movement of the packages or bundles past the trip the spring-pressed hammer will actuate the cam.

2. In a package tying machine, a supporting table, a knotting mechanism disposed below the table, a string-holder disposed below the table arranged in rear of the knotting mechanism, an elevated string support, an oscillating string-carrying needle rockably mounted above the table movable away from the string support toward and through the table past the knotting mechanism and the holding mechanism, means for actuating the knotting mechanism and the string-holding mechanism, and a tucker arm movable through the table and actuated from said last mentioned mechanism for engaging and holding the string tight against the package in advance of the knotting mechanism during initial movement of said knotting mechanism.

3. In a package and bundle tying machine, a supporting table, a knotting mechanism disposed below the table, an operating shaft, means for operating the knotting mechanism from the shaft, including a wheel having a sector gear thereon and a pinion on the knotting mechanism disposed in the path of the sector gear, a swinging string-holding tucker arm movable through the table over the knotting mechanism rockably mounted intermediate its ends, a cam on said wheel arranged slightly in advance of the sector gear for actuating the tucker arm, and means disposed adjacent the rear end of the sector gear for moving the tucker arm away from the string and package being tied.

4. In a package and bundle tying machine, a supporting table, knotting mechanism disposed below the table, a string holder disposed below the table and arranged in rear of the knotting mechanism, an operating shaft, means for actuating the string-holder from the shaft, means for operating the knotting mechanism from the shaft, including a wheel having a sector gear thereon and a pinion on the knotting mechanism disposed in the path of the sector gear, a swinging string-holding tucker arm movable through the table rockably mounted intermediate its ends, a cam on said wheel arranged slightly in advance of the sector gear for actuating the string holder and the trucker arm, means disposed adjacent the rear end of the sector gear for moving the trucker arm away from the string and package being tied, and a string-stripping and kick plate movable over the knotting mechanism having a guide slot for the string, means for operating the stripper and kick plate from said wheel, the knotting mechanism being adapted to pull the string-holder toward the stripper and kick plate during the operation of the knotting mechanism, and a string-cutting knife carried by said plate for severing the string after the operation of the knotting mechanism.

5. In a package and bundle tying machine, a table for receiving the work to be tied, a knotting mechanism disposed below the table and carried thereby, a string-holding mechanism carried by the table and disposed below the table arranged at one side of the knotting mechanism, means for actuating the knotting mechanism, and the string-holding mechanism, said string-holding mechanism being mounted for swinging movement, spring means normally holding the string-holding mechanism away from the knotting mechanism, a stripper plate disposed directly above the knotting mechanism having a string guide and receiving slot therein for carrying the string off the knotting mechanism, said plate being rockable laterally of the table and the knotting mechanism, means for rocking said plate from the mechanism for operating the knotting mechanism after the actuation of said knotting mechanism, the knotting mechanism being adapted to draw the string-holder toward the stripper plate, and a depending string-cutting knife carried by said plate movable over the string between the knotting mechanism and the string-holding mechanism for severing said string.

6. In a package and bundle tying machine, a table for receiving the packages and bundles to be tied, a string-holding mechanism disposed below the table and supported thereby, said string-holding mechanism including a pair of spaced string-gripping fingers and a shuttle movable over and between said fingers for holding twine between said fingers, the shuttle working the cut ends of the string from between said fingers during the movement thereof, a stationary guide trough carried by and disposed below the table inclining downward and away from the machine, and a loose twine end receiving cup carried by said fingers movable into said trough.

FRANK RADECK.